US012732745B2

(12) United States Patent
Naiki et al.

(10) Patent No.: US 12,732,745 B2
(45) Date of Patent: Sep. 8, 2026

(54) TRANSDUCER, ELECTRONIC DEVICE AND TRANSDUCER ARRAY

(71) Applicant: ROHM CO., LTD., Kyoto (JP)

(72) Inventors: Takashi Naiki, Kyoto (JP); Kenji Goda, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 530 days.

(21) Appl. No.: 18/152,029

(22) Filed: Jan. 9, 2023

(65) Prior Publication Data

US 2023/0239615 A1 Jul. 27, 2023

(30) Foreign Application Priority Data

Jan. 27, 2022 (JP) ................................ 2022-011099

(51) Int. Cl.

| | |
|---|---|
| ***H04R 1/40*** | (2006.01) |
| ***H04R 3/12*** | (2006.01) |
| ***H04R 7/04*** | (2006.01) |
| ***H04R 7/10*** | (2006.01) |
| ***H04R 17/00*** | (2006.01) |

(52) U.S. Cl.

CPC ............... *H04R 1/403* (2013.01); *H04R 3/12* (2013.01); *H04R 7/045* (2013.01); *H04R 7/10* (2013.01); *H04R 17/00* (2013.01); *H04R 2201/401* (2013.01); *H04R 2440/05* (2013.01)

(58) Field of Classification Search

CPC .. H04R 1/403; H04R 17/00; H04R 2201/401; H04R 2440/05; H04R 3/12; H04R 7/045; H04R 7/10; H04R 2201/003; H04R 31/00; H04R 7/04; H10N 30/306; H10N 30/308; H10N 30/87; H02N 2/04; H02N 2/18; H02N 2/185; H02N 2/186

USPC .................................................... 381/111, 92

See application file for complete search history.

(56) References Cited

U.S. PATENT DOCUMENTS

| | | | | |
|---|---|---|---|---|
| 2012/0250909 A1* | 10/2012 | Grosh | .................... | H10N 30/05 381/174 |
| 2013/0083630 A1 | 4/2013 | Onishi et al. | | |
| 2016/0353206 A1* | 12/2016 | Stahl | ...................... | H04R 1/028 |
| 2020/0382876 A1* | 12/2020 | Cerini | .................... | H04R 17/02 |

(Continued)

FOREIGN PATENT DOCUMENTS

| | | |
|---|---|---|
| JP | 2012105170 A | 5/2012 |
| JP | 2014515214 A | 6/2014 |
| WO | 2012011256 A1 | 1/2012 |

OTHER PUBLICATIONS

Notice of Reasons for Refusal with search report issued on Oct. 21, 2025 in corresponding Japanese patent application No. 2022-011099 (43 pages provided; with English machine translation).

*Primary Examiner* — Lun-See Lao

(74) *Attorney, Agent, or Firm* — HSML P.C.

(57) ABSTRACT

The present disclosure is related to a transducer. The transducer includes a substrate. A plurality of vibrating membranes, in a configuration of cantilevers, are disposed on a main surface of the substrate. A plurality of piezoelectric elements are stacked on the plurality of vibrating membranes for generating a voltage to excite each vibrating membrane. The cantilevers of the plurality of vibrating membranes extend in a direction from a reference point on the main surface toward the cantilevers, or in a direction from the cantilevers toward the reference point.

20 Claims, 8 Drawing Sheets

(56) References Cited

U.S. PATENT DOCUMENTS

| | | | | |
|---|---|---|---|---|
| 2023/0011826 | A1* | 1/2023 | Yee | G01H 11/08 |
| 2023/0067383 | A1* | 3/2023 | Baldasarre | B06B 1/0611 |

* cited by examiner

TRANSDUCER, ELECTRONIC DEVICE AND TRANSDUCER ARRAY

TECHNICAL FIELD

The present disclosure provides a transducer, an electronic device and a transducer array.

BACKGROUND

A transducer that transmits or receives sound waves or ultrasound waves is available in the prior art. For example, a transducer, which is manufactured by applying the microelectromechanical systems (MEMS) technology and in a type that drives a vibrating plate by a piezoelectric element sandwiched with piezoelectric films from both sides by a pair of electrodes, is used as a speaker for producing sound waves (for example, refer to patent publication 1).

PRIOR ART DOCUMENT

Patent Publication

[Patent document 1] Japan Patent Publication No. 2012-105170

SUMMARY

Problems to be Solved by the Disclosure

A transducer manufactured by the MEMS technology and in a type that drives a vibrating plate by a piezoelectric element has smaller dimensions and the vibration amplitude of the vibrating plate is also smaller, and as a result, may sometimes be incapable of producing a sufficient volume used for a speaker. In addition, sometimes the produced sound waves cannot be gathered in a specific direction.

The embodiments are provided in view of the actual conditions above, and aim to provide a transducer manufactured by the MEMS technology and in a type that drives a vibrating plate by a piezoelectric element; that is, a transducer capable of producing a sufficient volume when manufactured for the use of a speaker and capable of gathering sound waves in a specific direction, and an electronic device and a transducer array having such transducer.

Technical Means for Solving the Problem

A transducer according to an aspect of an embodiment includes: a substrate; a plurality of vibrating membranes, in a configuration of cantilevers and disposed on a main surface of the substrate; and a plurality of piezoelectric elements, stacked on the plurality of vibrating membranes, for generating a voltage to excite each vibrating membrane, wherein the cantilevers of the plurality of vibrating membranes extend in a direction from a reference point on the main surface toward the cantilevers, or in a direction from the cantilevers toward the reference point.

An electronic device according to an aspect of an embodiment includes a transducer of an embodiment as a speaker.

A transducer array according to an aspect of an embodiment includes a plurality of transducers. Each of the transducers includes: a substrate; a plurality of vibrating membranes in a configuration of cantilevers, disposed on a main surface of the substrate and extending in one direction within the main surface; and a plurality of piezoelectric elements, stacked on the plurality of vibrating membranes to excite each vibrating membrane, generating a voltage by means of vibrating the vibrating membranes, and including a plurality of transducers, wherein the plurality of transducers are in a two-dimensional arrangement with their main surfaces facing one side, and the cantilevers of the plurality of transducers extend in a direction from a reference point in a plane including the two-dimensional arrangement toward the transducers, or in a direction from the transducers toward the reference point.

Effects of the Disclosure

According to the embodiments, a transducer manufactured by the MEMS technology and in a type that drives a vibrating plate by a piezoelectric element, that is, a transducer capable of producing a sufficient volume when manufactured for the use of a speaker and capable of gathering sound waves in a specific direction, can be provided. In addition, an electronic device and a transducer array capable of producing a sufficient volume and capable of gathering sound waves in a specific direction can be further provided.

DETAILED DESCRIPTION OF THE EMBODIMENTS

Figure 1:
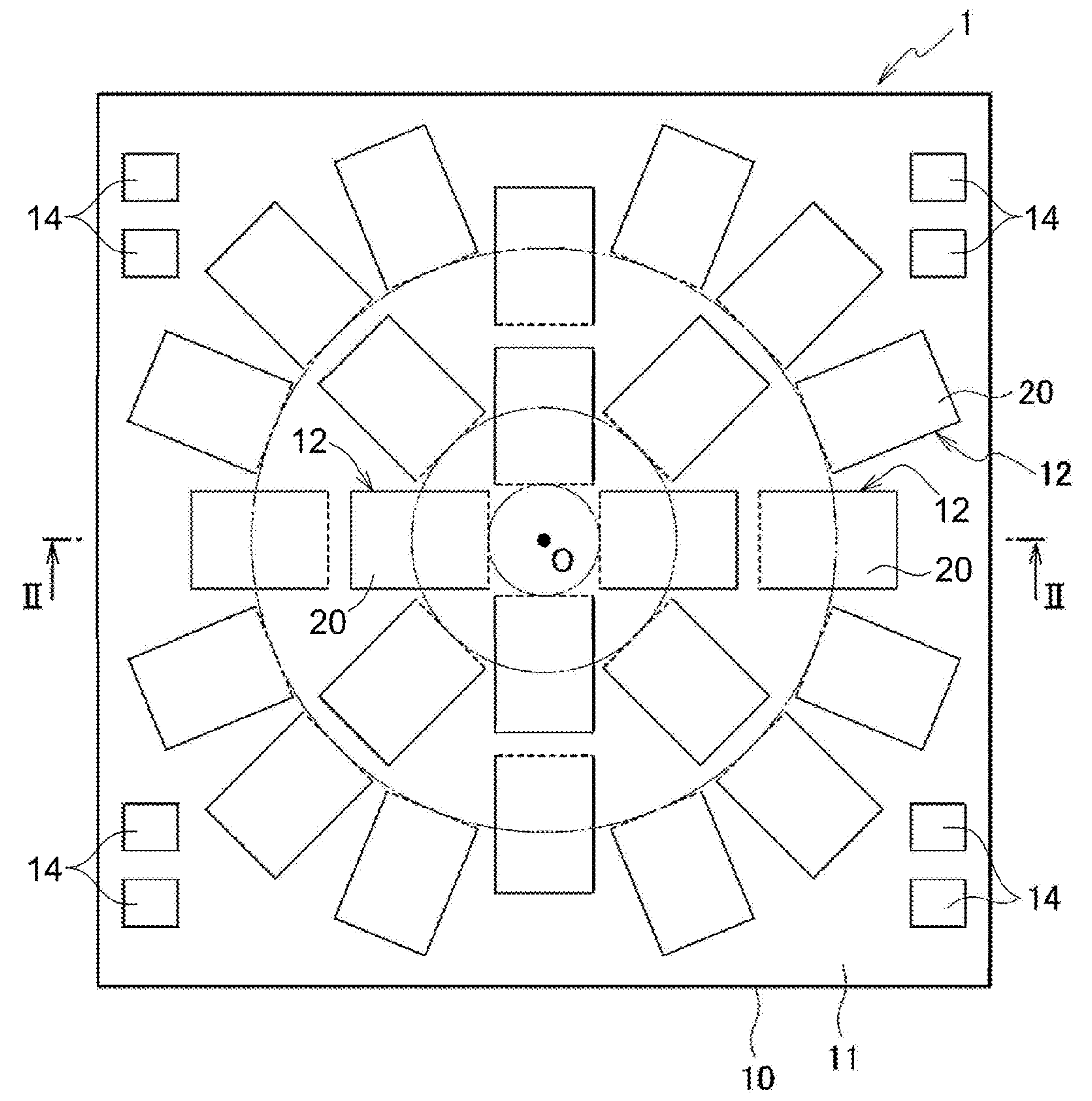
FIG. 1 is a top view of a transducer according to an embodiment.

Details of the embodiments of the disclosure are given with the accompanying drawings below. In the following description regarding the drawings, the same or similar denotation is assigned to the same or similar part. However, it should be noted that the drawings are illustrative, and the relationships between thicknesses and planar dimensions of the individual constituting components may be different from those of actual objects. Thus, specific thicknesses or dimensions should be determined with reference to the description below. In addition, the drawings further include parts with different dimensional relationships or ratios from each other.

Moreover, the embodiments below are examples for illustrating specific technical concepts, and do not specifically define materials, shapes, structures, configurations or dimensions of the constituting components. Various modifications may be made to the embodiments below on the basis of the configuration defined by the claims.

(Transducer)

Assume that a transducer of the embodiment is manufactured by the micro-electromechanical systems (MEMS) technology and is used as a speaker that produces sound waves. The transducer according to the embodiment is configured as below.

The transducer according the embodiment includes: a substrate; a plurality of vibrating membranes, in a configuration of cantilevers and disposed on a main surface of the substrate; and a plurality of piezoelectric elements, stacked on the plurality of vibrating membranes, for generating a voltage to excite each vibrating membrane, wherein the cantilevers of the plurality of vibrating membranes extend in a direction from a reference point on the main surface toward the cantilevers, or in a direction from the cantilevers toward the reference point. A traveling direction of sound waves generated by the cantilevers of the vibrating membranes can be controlled, and the sound waves produced from the transducer can be gathered.

The cantilevers of the plurality of vibrating membranes extend in a direction from the reference point toward the cantilevers, and bend upward in an initial stationary state from the main surface, and a degree of bending may increase as the vibrating membranes distance away from the reference point. Sound waves produced from the cantilevers of the vibrating membranes can be gathered.

The cantilevers of the plurality of vibrating membranes extend in a direction from the cantilevers toward the reference point, and bend downward in an initial stationary state from the main surface, and a degree of bending may increase as the vibrating membranes distance away from the reference point. Sound waves produced from the cantilevers of the vibrating membranes can be gathered.

In a pair of electrode layers of the plurality of piezoelectric elements, wirings are respectively connected from electrode pads to supply a voltage for driving the vibrating membranes. The plurality of piezoelectric elements are respectively driven by the voltage supplied from the wirings connected to a pair of electrode layers.

The wirings may include a wire common to the pair of electrode layers of the plurality of piezoelectric elements. The piezoelectric elements connected to the common wire can be synchronously driven.

The plurality of vibrating membranes include at least one group including a plurality of vibrating membranes arranged in at least a part of rotationally symmetrical positions around the reference point within the main surface. With the plurality of vibrating membranes in a rotationally symmetrical arrangement, sound waves for convergence can be effectively produced.

The wirings may include a wire common to each group of the plurality of vibrating membranes. The vibrating membranes of the each group can be synchronously driven.

A natural vibration frequency of the plurality of vibrating membranes may be a frequency greater than an audible range. Since the natural vibration frequency is not within the frequency range of the audible range, no deterioration in sound quality due to the natural vibration frequency of the vibrating membranes is generated in the audible range.

The plurality of vibrating membranes include vibrating membranes having same shape within a plane of the main surface. Designs and manufacturing of the transducer can be easily carried out.

The substrate may be made of a silicon substrate. The MEMS technology can be used to manufacture the transducer.

Figure 2:
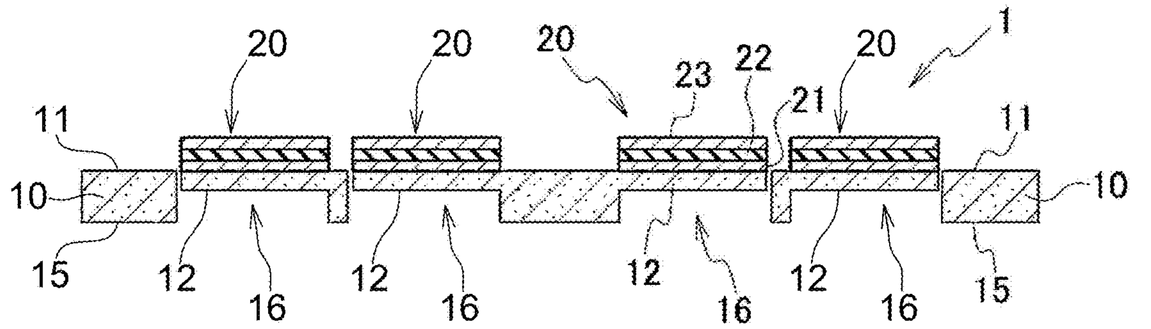
FIG. 2 is a section diagram of a transducer according to an embodiment.

FIG. 1 shows a top view of a transducer 1 according to an embodiment. FIG. 2 shows a section diagram of the transducer 1 according to the embodiment. The section diagram of FIG. 2 shows a cross section along a section line II-II in top view of FIG. 1. The transducer 1 of the embodiment is formed in a substrate 10 having a flat main surface 11 and a back surface 15 opposite to the main surface 11. The substrate 10 is a silicon substrate in a substantially plate-like shape having a predetermined thickness, and has a substantially rectangular shape with substantially equal longitudinal and lateral dimensions. In addition, the substrate 10 is not limited to being a silicon substrate, and may be formed of a glass substrate, an organic material or other types of raw materials.

A plurality of recesses 16 are formed on the back surface 15 of the substrate 10. The plurality of recesses 16 are formed up to a predetermined depth from the main surface 11, and leave the substrate 10 with the predetermined thickness to vibrate in a thickness direction of the substrate 10 from the main surface 11. Parts of the substrate 10 that are left with the predetermined thickness form a plurality of vibrating membranes 12. The plurality of vibrating membranes 12 have a substantially rectangular shape in top view, wherein each vibrating membrane 12 in a substantially rectangular shape has only one side thereof connected to the main surface 11 and the three remaining sides form gaps and are thus separated from the main surface 11, hence forming cantilevers, that is, cantilever beams.

An extension direction of the cantilevers of the plurality of vibrating membranes 12, that is, a direction from a fixed end of the cantilevers to a free end, is set to be a direction from a reference point O substantially at a center of the main surface 11 toward the vibrating membranes 12. The plurality of vibrating membranes 12 form cantilevers of a substantially rectangular shape with substantially the same dimensions within the main surface 11. In addition, since the cantilevers of the plurality of vibrating membranes 12 are used to produce sound waves for a speaker, a natural vibration frequency thereof is set to be a frequency greater than an audible range.

On each of the plurality of vibrating membranes 12, a piezoelectric element 20 formed by a pair of electrode layers including a lower electrode layer 21 and an upper electrode layer 23 sandwiching a piezoelectric layer 22 is stacked. The piezoelectric elements 20 excite the vibrating membranes 12 in a thickness direction of the substrate 10 by a voltage supplied by a wiring layer not shown in the drawings. The piezoelectric elements 20 stacked on the plurality of vibrating membranes 12 also have a substantially rectangular shape according to the substantially rectangular cantilevers, that is, the shape of the plurality of vibrating membranes 12.

Figure 3A:
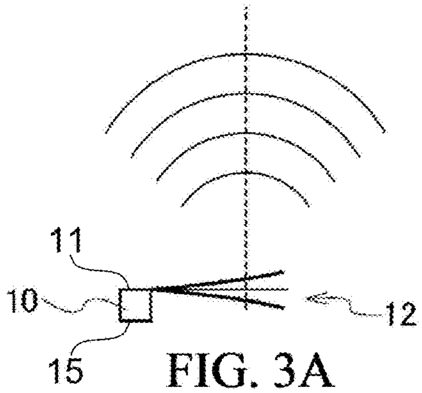
FIG. 3A is a schematic diagram of a traveling direction of sound waves produced from cantilevers of vibrating membranes.
Figure 3B:
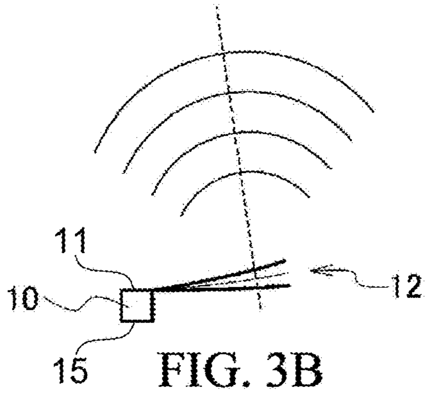
FIG. 3B is a schematic diagram of a traveling direction of sound waves produced from cantilevers of vibrating membranes.
Figure 3C:
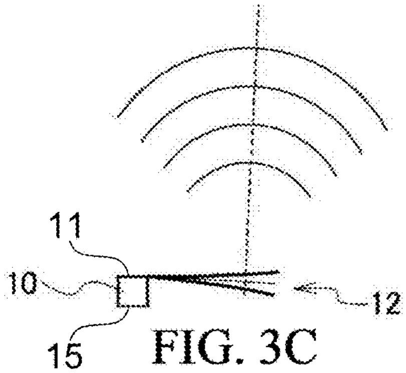
FIG. 3C is a schematic diagram of a traveling direction of sound waves produced from cantilevers of vibrating membranes.

FIG. 3A to FIG. 3C show schematic diagrams of a traveling direction of sound waves produced from the cantilevers of the vibrating membranes 12. FIG. 3A to FIG. 3C show schematic diagrams illustrating cantilevers of individual vibrating membranes 12. The cantilevers of the vibrating membranes 12 are drive by the voltage supplied to the piezoelectric elements 20, and vibrate in a depth direction of the substrate 10. The vibration amplitude of the cantilevers gradually increases from the fixed end to the free end, and is the largest at the free end. In the drawings, cantilevers in an initial stationary state are depicted. In addition, a cantilever that bends most upward and a cantilever that bends most downward by means of vibration are depicted. Moreover, the term "downward" refers to the depth direction of the substrate 10, and the term "upward" refers to a direction away from the main surface 11 of the substrate 10.

In FIG. 3A, the cantilever in an initial stationary state is located inside the plane of the main surface 11, and the vibration amplitudes of the cantilever bending upward and downwards are substantially equal. Sound waves produced from the cantilever of the vibrating membrane 12 travel toward a normal direction of the cantilever in the initial state, that is, toward a normal direction of the main surface 11. The initial state of such cantilever located within the main surface 11 can be set during manufacturing, and can be controlled by a voltage applied to the piezoelectric element 20.

In FIG. 3B, the cantilever in the initial state bends upward from the main surface 11. The upward and downward vibration amplitudes of the cantilever from the initial state are substantially equal. Sound waves produced from the cantilever of the vibrating membrane 12 in the initial state travel from the main surface 11 toward a normal direction of the cantilever bent upward, and thus travel in an inclined direction from the normal direction of the main surface 11 toward the reference point O. The initial state of such in-plane cantilever bent upward from the main surface 11 can be set during manufacturing, and can be controlled by a voltage applied to the piezoelectric element 20. The degree of bending of the cantilever can also be controlled by a voltage applied to the piezoelectric element 20.

In FIG. 3C, the cantilever in the initial state bends downward from the main surface 11. The upward and downward vibration amplitudes of the cantilever from the initial state are substantially equal. Sound waves produced from the cantilever of the vibrating membrane 12 in the initial state travel from the main surface 11 toward a normal direction of the cantilever bent downward, and thus travel in a direction opposite to a direction from the normal direction of the main surface 11 toward the reference point O, that is, in an inclined direction toward away from the reference point O. The initial state of such in-plane cantilever bent downward from the main surface 11 can be set during manufacturing, and can be controlled by a voltage applied to the piezoelectric element 20. The degree of bending of the cantilever can also be controlled by a voltage applied to the piezoelectric element 20.

Figure 3D:
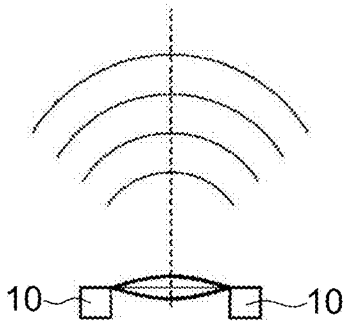
FIG. 3D is a schematic diagram of a comparison example, indicating a traveling direction of sound waves produced from vibrating membranes of two end beams.

FIG. 3D serves as a comparison example and is a diagram for illustrating sound waves produced by vibrating membranes of two end beams. The vibrating membranes of the two end beams are supported by fixed ends on two sides. The vibrating membranes in an initial stationary state are located within a plane including the fixed ends, and vibrate upward and downward by substantially the same vibration amplitudes. Sound waves produced from the vibrating membranes of the two end beams travel toward a normal direction of the plane including the fixed ends.

Figure 4:
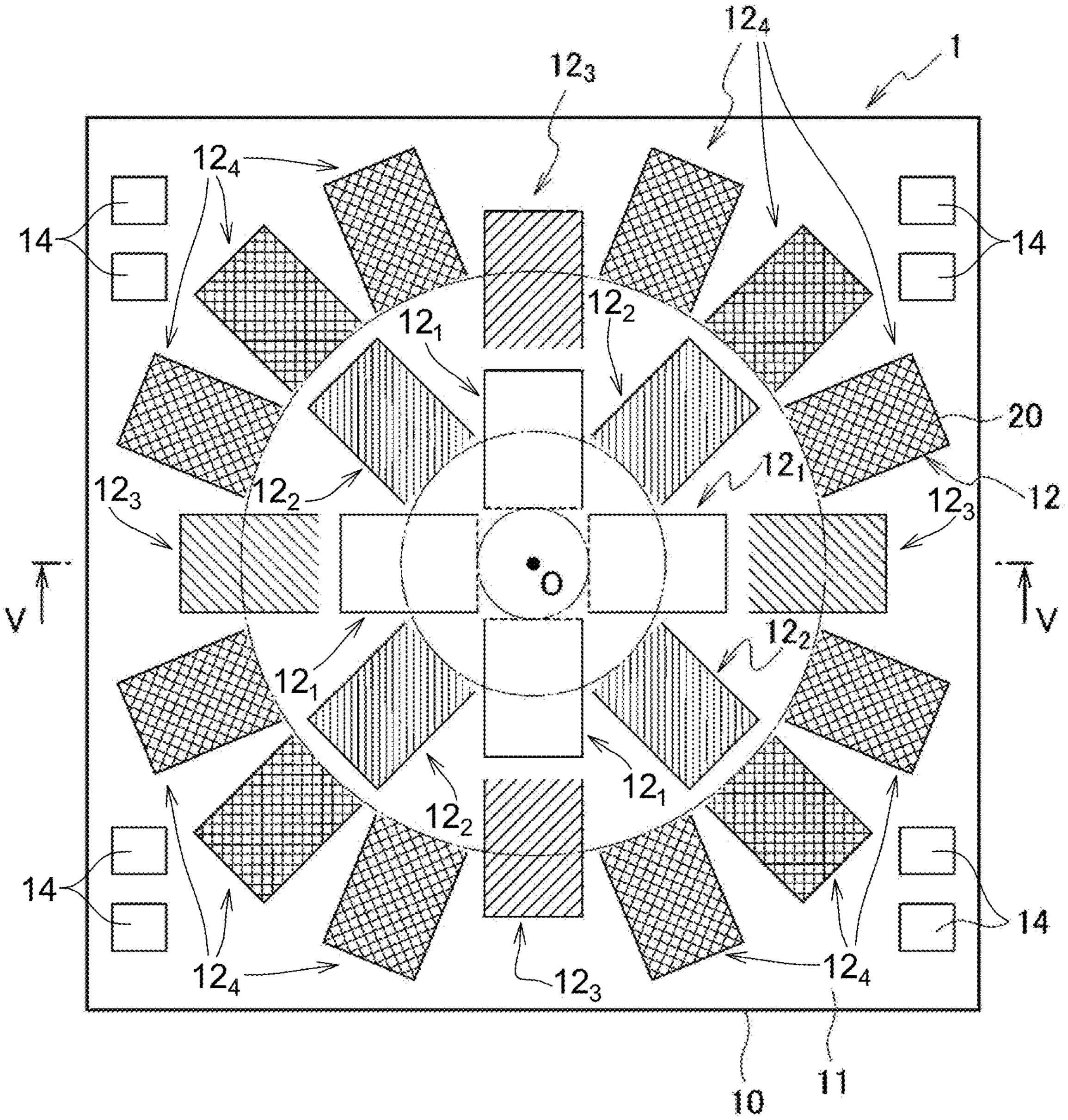
FIG. 4 is a top view of a configuration of vibrating membranes on a main surface of a transducer according to an embodiment.

FIG. 4 shows a top view of a configuration of the vibrating membranes 12 on the main surface 11 of the substrate 10 of the transducer 1. The plurality of vibrating membranes 12 include four vibrating membranes 12, which are adjacent to the reference point O located substantially at a center of the main surface 11, and are configured with fixed ends on a periphery distanced from the reference point O by a predetermined interval and around the reference point O, that is, on four rotationally symmetrical positions around the reference point O. The cantilevers of the four vibrating membranes 12 extend along a longitudinal or lateral direction of the substrate 10 in a substantially rectangular shape in top view. These four vibrating membranes 12 are referred to as first peripheral vibrating membranes $\mathbf{12}_1$.

The plurality of vibrating membranes 12 include four vibrating membranes 12, and are configured with fixed ends on a periphery distanced from the reference point O by an interval larger than the interval from the reference point O to the fixed ends of the first peripheral vibrating membranes $\mathbf{12}_1$ and smaller than an interval from the reference point O to the free ends of the cantilevers of the first peripheral vibrating membranes $\mathbf{12}_1$, that is, on four rotationally symmetrical positions around the reference point O. An extension direction of the cantilevers of the four vibration membranes 12 and an extension direction of the cantilevers of the adjacent first peripheral vibrating membranes $\mathbf{12}_1$ form an angle of approximately 45 degrees. These four vibrating membranes 12 are referred to as second peripheral vibrating membranes $\mathbf{12}_2$.

The plurality of vibrating membranes 12 include four vibrating membranes 12, and are configured with fixed ends on a periphery distanced from the reference point O by an interval larger than the interval from the reference point O to the free ends of the cantilevers of the first peripheral vibrating membranes $\mathbf{12}_1$ and smaller than an interval from the reference point O to the free ends of the cantilevers of the second peripheral vibrating membranes $\mathbf{12}_2$, that is, on four rotationally symmetrical positions around the reference point O. The cantilevers of the four vibrating membranes 12 extend along a longitudinal or lateral direction of the substrate 10. An extension direction of the cantilevers of the four vibration membranes 12 and an extension direction of the cantilevers of the adjacent second peripheral vibrating membranes $\mathbf{12}_2$ form an angle of approximately 45 degrees. These four vibrating membranes 12 are referred to as third peripheral vibrating membranes $\mathbf{12}_3$.

The plurality of vibrating membranes 12 include twelve vibrating membranes 12, and are configured with fixed ends on a periphery distanced from the reference point O by an interval larger than the interval from the reference point O to the free ends of the cantilevers of the second peripheral vibrating membranes $\mathbf{12}_2$ and smaller than an interval from the reference point O to the free ends of the cantilevers of the third peripheral vibrating membranes $\mathbf{12}_3$, that is, on sixteen rotationally symmetrical positions in twelve directions except for four directions overlapping with the third peripheral vibrating membranes $\mathbf{12}_3$ around the reference point O. An extension direction of the cantilevers of four among the twelve cantilevers 12 are the same as the extension direction of the second peripheral vibrating membranes $\mathbf{12}_2$. The cantilevers of four among the remaining eight vibrating membranes 12 are adjacent to the third peripheral vibrating membranes $\mathbf{12}_3$, and form an angle of approximately 22.5 degrees relative to the cantilevers of the adjacent third peripheral vibrating membranes $\mathbf{12}_3$. These twelve vibrating membranes 12 are referred to as fourth peripheral vibrating membranes $\mathbf{12}_4$.

Most of the main surface 11 having a substantially rectangular shape in top view is occupied by the first peripheral vibrating membranes $\mathbf{12}_1$, the second peripheral vibrating membranes $\mathbf{12}_2$, the third peripheral vibrating membranes $12_3$ and the fourth peripheral vibrating membranes $12_4$. On parts near four vertices of the main surface 11 not disposed with the vibrating membranes 12, a plurality of electrode pads 14 are formed on a pair of sides individually extending in the longitudinal direction of the substrate 10. A wire from the plurality of electrode pads 14 to the piezoelectric element 12 that drives each of the vibrating membranes 12 of the first peripheral vibrating membranes $12_1$, the second peripheral vibrating membranes $12_2$, the third peripheral vibrating membranes $12_3$ and the fourth peripheral vibrating membranes $12_4$ arranged on the main surface 11 is set to be common, and is connected to be able to independently drive in synchronization each of the first peripheral vibrating membranes $12_1$, the second peripheral vibrating membranes $12_2$, the third peripheral vibrating membranes $12_3$ and the fourth peripheral vibrating membranes $12_4$.

Figure 5:
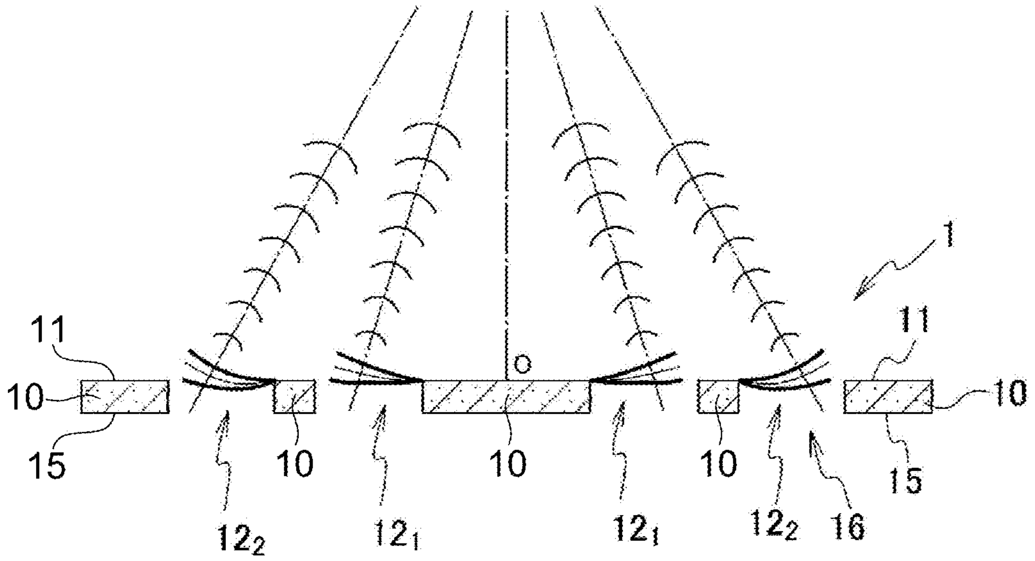
FIG. 5 is a section diagram of a traveling direction of sound waves produced from a transducer.

FIG. 5 shows a section diagram of a traveling direction of sound waves produced from the transducer 1. The cantilevers of the plurality of vibrating membranes 12 disposed on the main surface 11 of the substrate 10 extend in a direction from the reference point O substantially at the center of the main surface 11 toward the vibrating membranes 12, and the cantilevers in the initial stationary state bend further upward from the main surface 11 as the vibrating membranes 12 distance away from the reference point O. For example, for the first peripheral vibrating membranes $12_1$ to the fourth peripheral vibrating membranes $12_4$ in FIG. 4, the degree of bending upward of the cantilevers in the initial state on each periphery gradually increases in an order of from the first peripheral vibrating membranes $12_1$ to the fourth peripheral vibrating membranes $12_4$.

Thus, the degree of bending upward of the cantilevers in the initial state of the vibrating membranes 12 from the main surface 11 increases as the vibrating membranes 12 distance away from the reference point O. The sound waves produced from the cantilevers of the vibrating membranes 12 travel toward the normal direction of the cantilevers in the initial state of the vibrating membranes 12, and then travel toward an inclined direction on the normal line on the reference point O of the main surface 11 as the vibrating membranes 12 distance away from the reference point O. Thus, the sound waves produced from the cantilevers of the plurality of vibrating membranes 12 disposed on the main surface 11 travel to so as to converge toward the normal line of the reference point O of the main surface 11. The level of convergence can be adjusted by means of controlling the degree of bending of the cantilevers of the vibrating membranes 12.

In the transducer 1 of the embodiment, the extension direction of the cantilevers of the plurality of vibrating membranes is set to be a direction from the reference point O of the main surface 11 toward the vibrating membranes 12; however, the present invention is not limited to the above example, and such extension direction may also be set to be a direction from the vibrating membranes 12 toward the reference point O. In this case, in order to have the sound waves produced from the cantilevers of the plurality of vibrating membranes 12 of the transducer 1 travel so as to converge toward the normal line of the reference point O on the main surface 11, the degree of bending downward, in the initial state from the main surface, 11 of the cantilevers of the plurality of vibrating membranes 12 disposed on the main surface 11, increases as the vibrating membranes 12 distance away from the reference points O.

In the transducer 1 of the embodiment, for the vibrating membranes 12 having substantially disc-shaped cantilevers having substantially the same dimensions, groups including the vibrating membranes 12 arranged on at least a part of rotationally symmetrical positions around the reference point O substantially at the center of the main surface 11 are arranged in four groups from the first peripheral vibrating membranes $12_1$ to the fourth peripheral vibrating membranes $12_4$. Thus, most of the main surface 11 is occupied by the plurality of vibrating membranes 12 including the first peripheral vibrating membranes $12_1$ to the fourth peripheral vibrating membranes $12_4$. With the above configuration, the plurality of vibrating membranes 12 can be arranged at a high density on the main surface 11. Thus, most of the main surface 11 is efficiently used as the vibrating membranes 12, so that the transducer 1 is able to produce a sufficient volume of the use of a speaker.

In the transducer 1 of the embodiment, by means of appropriately designing the degree of bending of the cantilevers of the plurality of vibrating membranes 12 in an initial state disposed on the main surface 11, sound waves can be gathered. Accordingly, the sound waves produced from the transducers 1 is provided with directivity, so that the sound waves produced by the transducer 1 can be efficiently utilized. In addition, since the transducer 1 of the embodiment is manufactured by applying the MEMS technology of semiconductor manufacturing technologies, multiple single chips can be made with high precision at one time.

Figure 6:
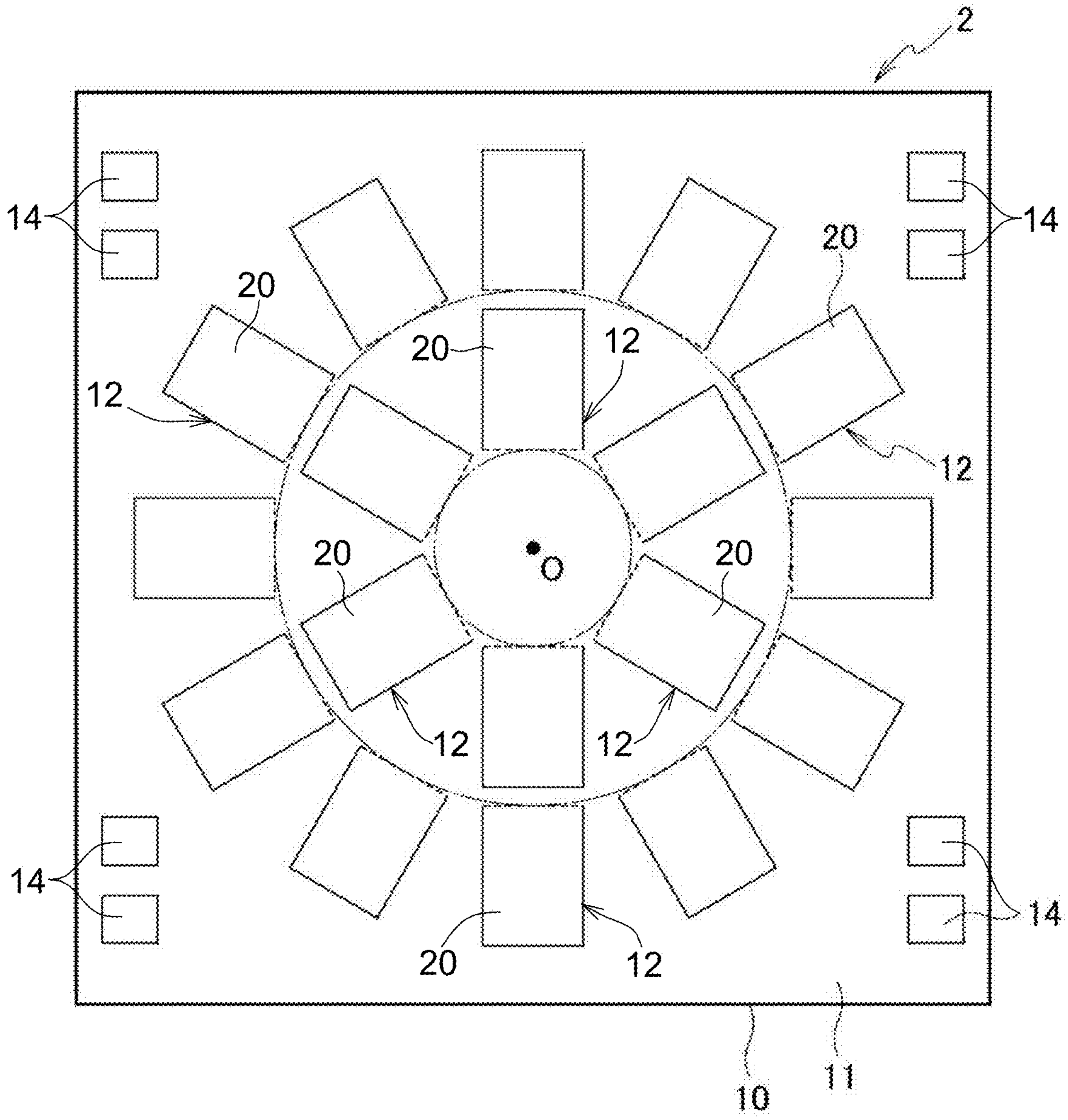
FIG. 6 is a top view of a transducer according to a variation example.

FIG. 6 shows a top view of a transducer 2 according to a variation example. The transducer 2 of the variation example in FIG. 6 differs from the transducer of the embodiment shown in FIG. 1 in respect of the configuration of the cantilevers of the vibrating membranes 12 on the main surface 11, while the remaining parts are identically structured. Thus, the constituting components common with the transducer 1 of the embodiment are denoted by the same reference numerals or symbols for a clear relationship.

In the transducer 2 of the variation example, similar to the transducer 1 of the embodiment, a plurality of vibrating membranes 12 are disposed on the main surface 11 of the substrate 10 having a substantially rectangular shape with substantially equal longitudinal and lateral dimensions in top view. The plurality of vibrating membranes 12 have a substantially rectangular shape in top view, wherein each vibrating membrane 12 in a substantially rectangular shape has only one side thereof connected to the main surface 11 and the three remaining sides form gaps and are thus separated from the main surface 11, hence forming cantilevers. An extension direction of the cantilevers of the vibrating membranes 12 is set to be a direction from a reference point O substantially at a center of the main surface 11 toward the vibrating membranes 12. The plurality of vibrating membranes 12 form cantilevers of a substantially rectangular shape with substantially the same dimensions within the main surface 11.

Figure 7:
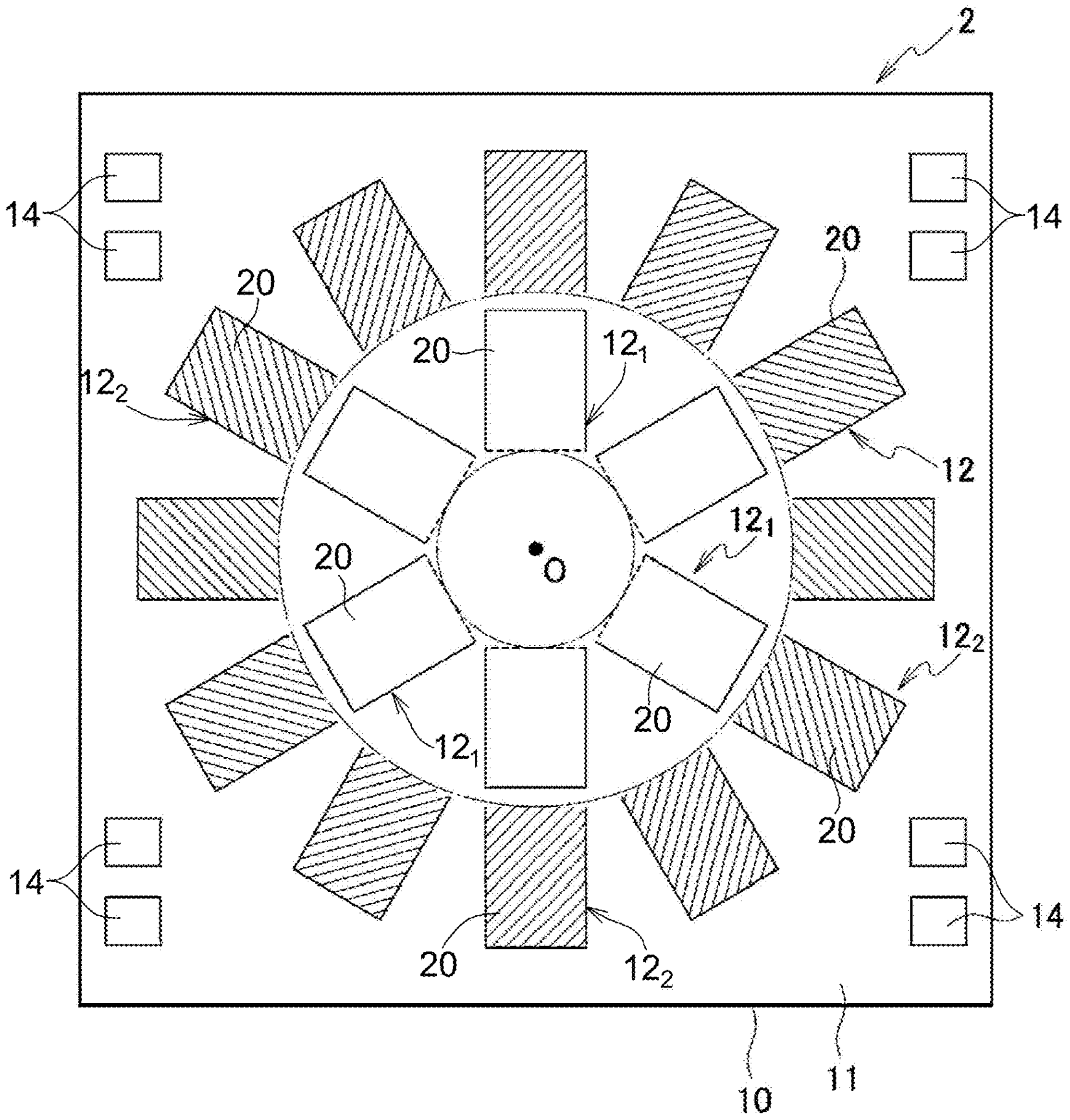
FIG. 7 is a top view of a configuration of vibrating membranes on a main surface of a transducer according to a variation example.

FIG. 7 shows a top view of a configuration of vibrating membranes on a main surface of a transducer according to the variation example. The plurality of vibrating membranes 12 include six vibrating membranes 12, which are adjacent to the reference point O located substantially at the center of the main surface 11, and are configured with fixed ends on a periphery distanced from the reference point O by a predetermined interval and around the reference point O, that is, on sixth rotationally symmetrical positions around the reference point O. Among the cantilevers of the sixth vibrating membranes 12, a pair of the cantilevers opposite to each other with the reference point O in between extend along a longitudinal direction of the substrate 10 in a substantially rectangular shape in top view. These sixth vibrating membranes 12 are referred to as first peripheral vibrating membranes $12_1$.

The plurality of vibrating membranes 12 include twelve vibrating membranes 12, which are configured with fixed ends on a periphery distanced from the reference point O by an interval larger than the interval from the reference point O to the free ends of cantilevers of the first peripheral vibrating membranes $12_1$, that is, on twelve symmetrical positions around the reference point O. Among the cantilevers of the twelve vibrating membranes 12, the cantilevers of six vibrating membranes 12 alternately arranged on the periphery extend in the same direction as the six cantilevers of the first peripheral vibrating membranes $12_1$. These twelve vibrating membranes 12 are referred to as second peripheral vibrating membranes $12_2$.

Most of the main surface 11 having a substantially rectangular shape in top view is occupied by the first peripheral vibrating membranes $12_1$ and the second peripheral vibrating membranes $12_2$. On parts near four vertices of the main surface 11 not disposed with the vibrating membranes 12, a plurality of electrode pads 14 are formed on a pair of sides individually extending in the longitudinal direction of the substrate 10. A wire from the plurality of electrode pads 14 to the piezoelectric element 12 that drives each of the vibrating membranes 12 of the first peripheral vibrating membranes $12_1$ and the second peripheral vibrating membranes $12_2$ disposed on the main surface 11 is set to be common, and is connected to be able to independently drive in synchronization each of the first peripheral vibrating membranes $12_1$ and the second peripheral vibrating membranes $12_2$.

The cantilevers of the plurality of vibrating membranes 12 disposed on the main surface 11 of the substrate 10 extend in a direction from the reference point O substantially at the center of the main surface toward the vibrating membranes 12, and a degree of bending upward of the cantilevers in the initial stationary state from the main surface 11 increases as the cantilevers distance away from the reference point O. For example, for the first peripheral vibrating membranes $12_1$ and the second peripheral vibrating membranes $12_2$ in FIG. 7, the degree of bending upward of the cantilevers of the vibrating membranes 12 in the initial state from the main surface 11 gradually increases in an order of from the first peripheral vibrating membranes $12_1$ to the second peripheral vibrating membranes $12_2$.

The sound waves produced from the cantilever of the vibrating membrane 12 travel toward the normal direction of the cantilever in the initial state of the vibrating membrane 12, and then travel in an inclined direction from the normal direction of the main surface 11 toward the reference point O of the main surface 11 as the vibrating membrane 12 distances away from the reference point O. Thus, the sound waves produced from the cantilevers of the plurality of vibrating membranes 12 disposed on the main surface 11 travel so as to converge toward the normal line of the reference point O of the main surface 11. The level of convergence can be adjusted by means of controlling the degree of bending of the cantilevers of the vibrating membranes 12.

In the transducer 2 of the variation example, the extension direction of the cantilevers of the plurality of vibrating membranes 12 is set to be a direction from the reference point O of the main surface 11 toward the vibrating membranes 12; however, the present invention is not limited to the above example, and such extension direction may also be set to be a direction from the vibrating membranes 12 toward the reference point O. In this case, in order to have the sound waves produced from the cantilevers of the plurality of vibrating membranes 12 of the transducer 2 travel so as to converge toward the normal line of the reference point O on the main surface 11, the degree of bending downward, in the initial state from the main surface 11, of the cantilevers of the plurality of vibrating membranes 12 disposed on the main surface 11, increases as the vibrating membranes 12 distance away from the reference points O.

In the transducer 2 of the variation example, the cantilevers of the plurality of vibrating membranes 12 of the main surface 11 are formed to have a different configuration from that of the transducer 1 of the embodiment. In the transducer 2 of such variation example, the plurality of vibrating membranes 12 can be arranged at a high density on the main surface 11, so that the transducer 2 is able to produce a sufficient volume of the use of a speaker. In addition, similar to the transducer 1 of the embodiment, in the transducer 2 of the variation example, the sound waves produced can also be gathered and have directivity. Moreover, since the transducer 2 of the variation example is also manufactured by applying the MEMS technology of semiconductor manufacturing technologies, multiple single chips can be made with high precision at one time.

(Electronic Device)

An electronic device of the embodiment includes the transducer 1 of the embodiment as a speaker. An electronic device of the embodiment includes the transducer 1 of the embodiment as a loudspeaker, and is thus able to produce a sufficient volume and can gather sound waves produced.

Figure 8:
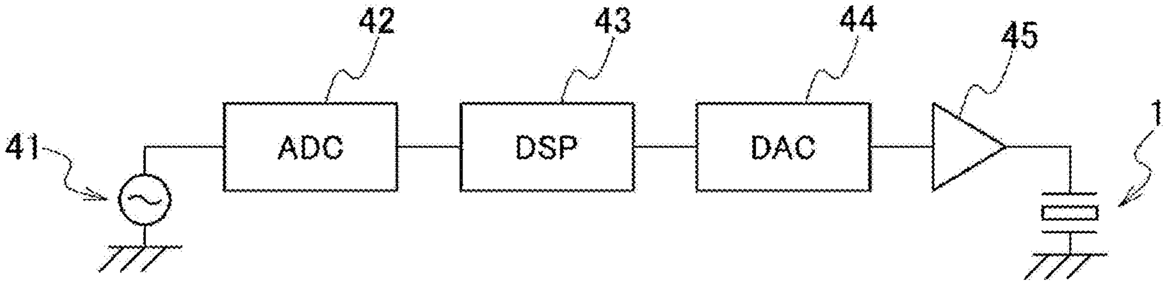
FIG. 8 is a block diagram of an electronic device.

FIG. 8 shows a diagram of a configuration of an electronic device according to the embodiment. The electronic device of the embodiment includes the transducer 1 of the embodiment as a loudspeaker, and in order to be able to produce sound waves of certain sound quality from the transducer 1 according to sound signals input from a signal source 41, further includes an analog-to-digital converter (ADC) 42, a digital signal processor (DSP) 43, a digital-to-analog converter (DAC) 44 and an amplifier 45.

In the electronic device, the sound signals input from the signal source 41 and serving as analog signals are converted to digital signals by the ADC 42, and undergo specific processing implemented by the DSP 43. For example, the DSP 43 compensates a frequency characteristic of the transducer 1, controls the phase of the transducer 1, or performs processing such as equalizer or surround according to requirements. The sound signals processed by the DSP 43 are converted into analog signals by the DAC 44, amplified by the amplifier 45 and are supplied to the transducer 1.

Since the electronic device of the embodiment includes the transducer 1 of the embodiment as a speaker, a sufficient volume can be provided even if the speaker is small-sized. In addition, the sound waves produced by the transducer 1 can also be gathered and have directivity. Moreover, since the transducer 1 provided in the electronic device is manufactured by applying the MEMS technology of semiconductor manufacturing technologies, multiple single chips can be made with high precision at one time.

(Transducer Array)

A transducer array of the embodiment includes a plurality of transducers. Each of the transducers includes: a substrate; a plurality of vibrating membranes in a configuration of cantilevers, disposed on a main surface of the substrate and extending in one direction within the main surface; and a plurality of piezoelectric elements, stacked on the plurality of vibrating membranes to excite each vibrating membrane, wherein the plurality of transducers are in a two-dimensional arrangement with their main surfaces facing one side, and the cantilevers of the plurality of transducers extend in a direction from a reference point in a plane including the two-dimensional arrangement toward the transducers, or in a direction from the transducers toward the reference point. In addition, the term “one side” refers to one side of the plane including the two-dimensional arrangement of the plurality of transducers. A traveling direction of sound waves produced from the transducer can be controlled, and the sound waves produced from the transducer can be gathered.

The cantilevers of the vibrating membranes of the plurality of transducers extend in a direction from the reference point toward the cantilevers, and bend upward in an initial stationary state from the main surface, and a degree of bending may increase as the transducers distance away from the reference point. Sound waves produced from the transducers can be gathered.

The cantilevers of the vibrating membranes of the plurality of transducers extend in a direction from the transducers toward the reference point, and bend downward in an initial stationary state from the main surface, and a degree of bending may increase as the transducers distance away from the reference point. Sound waves produced from the transducers can be gathered.

The transducer array includes at least one group of groups. The group includes a plurality of transducers arranged in at least a part of rotationally symmetrical positions around the reference point within the main surface including the two-dimensional arrangement. With the plurality of transducers in a rotationally symmetrical arrangement, sound waves for convergence can be effectively produced.

Figure 9:
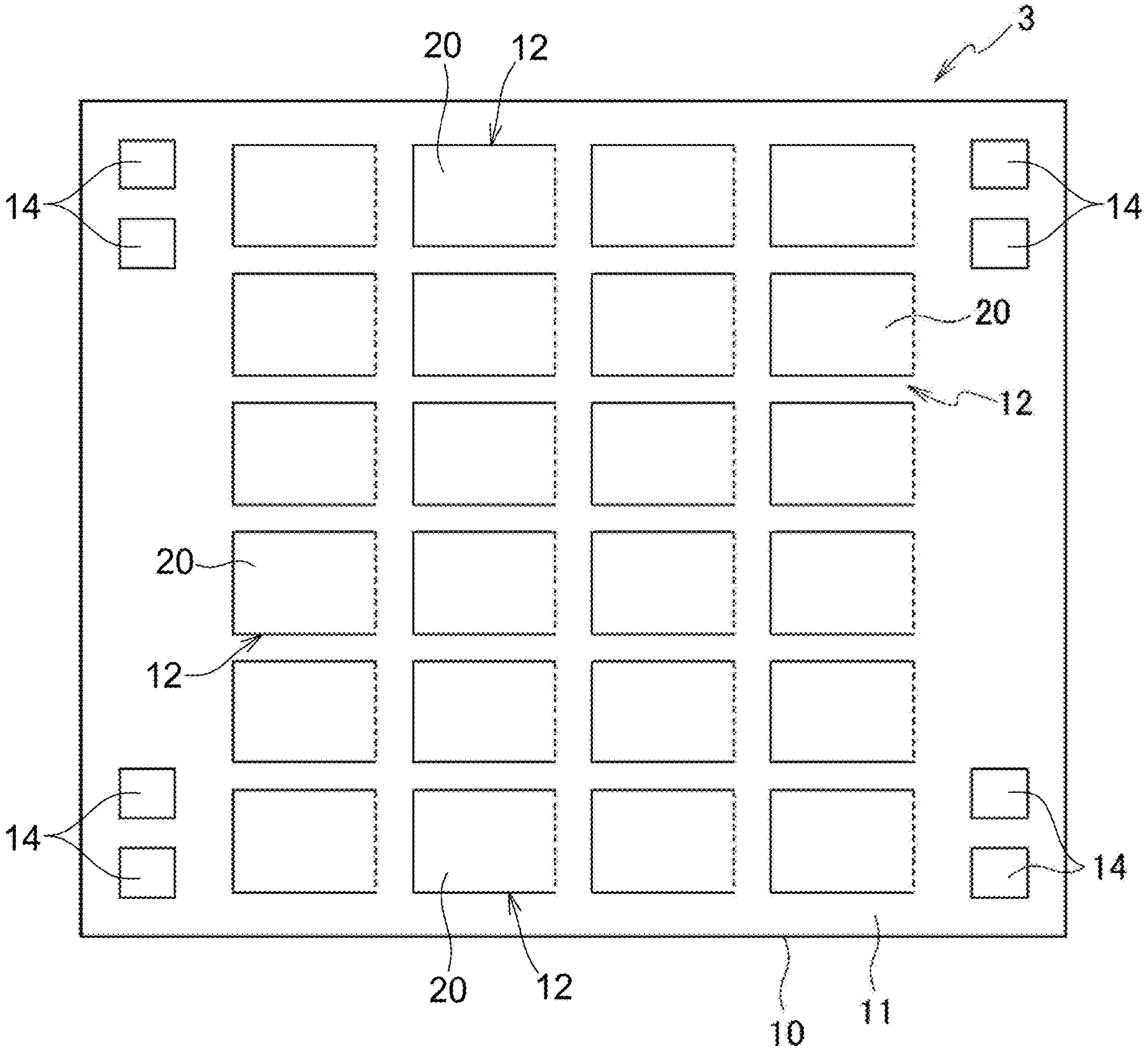
FIG. 9 is a top view of a transducer forming a transducer array according to an embodiment.

FIG. 9 shows a top view of a transducer forming a transducer array according to an embodiment. A transducer 3 forming a transducer array of the embodiment differs from the transducer 1 of the embodiment shown in FIG. 1 in respect of the configuration of the cantilevers of the vibrating membranes 12 on the main surface 11, while the remaining parts are identically structured. Thus, the constituting components common with the transducer 1 of the embodiment are denoted by the same reference numerals or symbols for a clear relationship.

In the transducer 3 of the embodiment, similar to the transducer 1 of the embodiment, a plurality of vibrating membranes 12 are disposed on the main surface 11 of the substrate 10 having a substantially rectangular shape with substantially equal longitudinal and lateral dimensions in top view. The plurality of vibrating membranes 12 have a substantially rectangular shape in top view, wherein each vibrating membrane 12 in a substantially rectangular shape has only one side thereof connected to the main surface 11 and the three remaining sides form gaps and are thus separated from the main surface 11, hence forming cantilevers. The plurality of vibrating membranes 12 are equidistantly arranged into six rows in a longitudinal direction and four columns in a lateral direction on the main surface 11, and the cantilevers of the plurality of vibrating membranes 12 extend along a lateral direction of the main surface 11. The plurality of vibrating membranes 12 form cantilevers of a substantially rectangular shape with substantially the same dimensions within the main surface 11.

Most of the main surface 11 having a substantially rectangular shape in top view is occupied by the plurality of vibrating membranes 12 equidistantly arranged into six rows in the longitudinal direction and four columns in the lateral direction. On parts near four vertices of the main surface 11 not disposed with the vibrating membranes 12, a plurality of electrode pads 14 are formed on a pair of sides individually extending in the longitudinal direction of the main surface 11. A wire from the plurality of electrode pads 14 toward the plurality of vibrating membranes 12 is set to be common, and is connected to be able to drive the plurality of vibrating membranes 12.

The cantilevers of the plurality of vibrating membranes 12 formed on the main surface 11 of the substrate 10 extend laterally along a direction of the substrate 10, and a degree of bending upward of the cantilevers in an initial stationary state from the main surface 11 is set to be equal regardless of the positions of the vibrating membranes 12 of the main surface 11. The degree of bending such cantilevers can be set during manufacturing, and can be controlled by a voltage applied to the piezoelectric element 20.

In the transducer 3, the cantilevers of the vibrating membranes 12 vibrate upward and downward by a substantially the same vibration amplitude and produce sound waves. The sound waves produced from the transducer 3 travel toward a specific direction, which is a normal direction of the cantilevers of the vibrating membranes 12 extending in one direction and set to bend upward in the initial state from the main surface.

Figure 10:
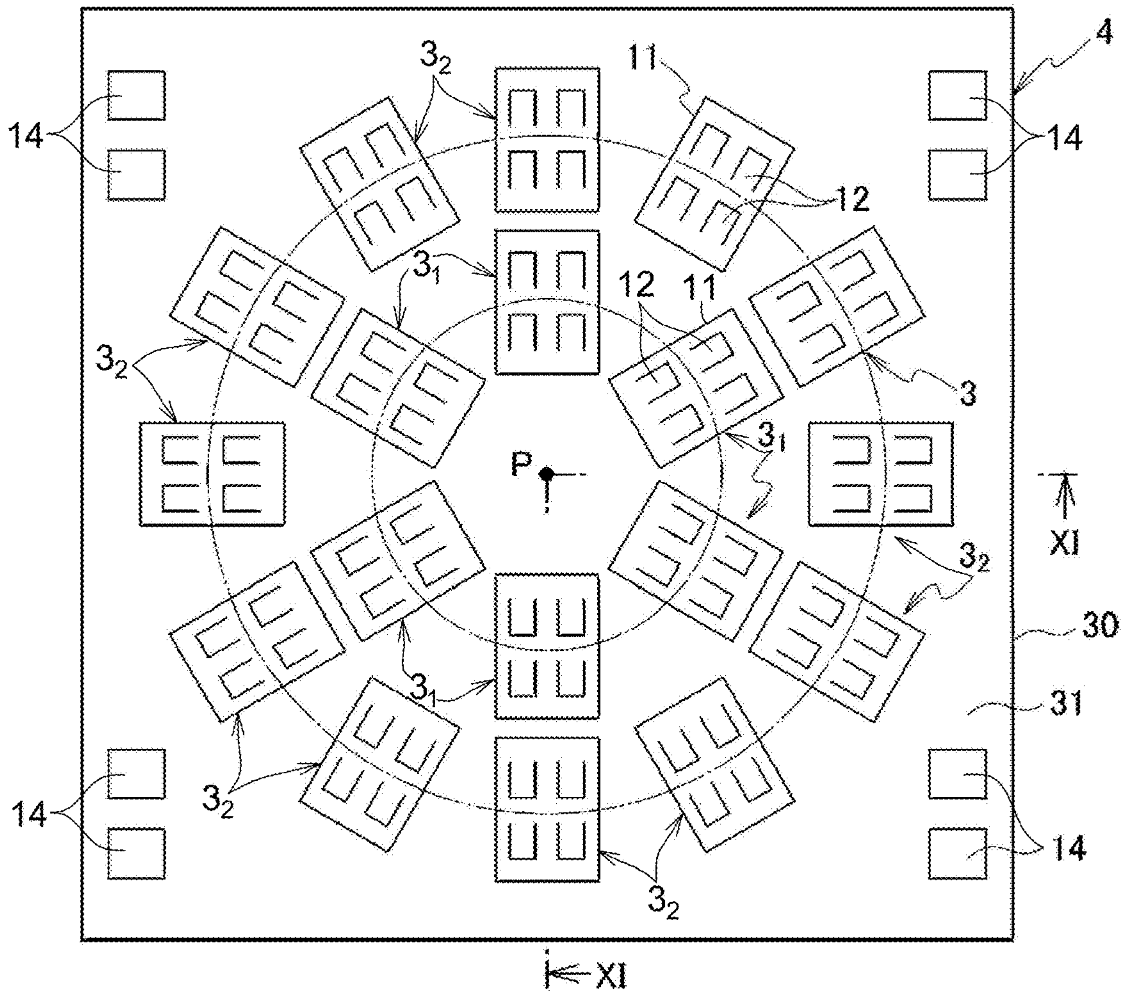
FIG. 10 is a top view of a transducer array according to an embodiment.
Figure 11:
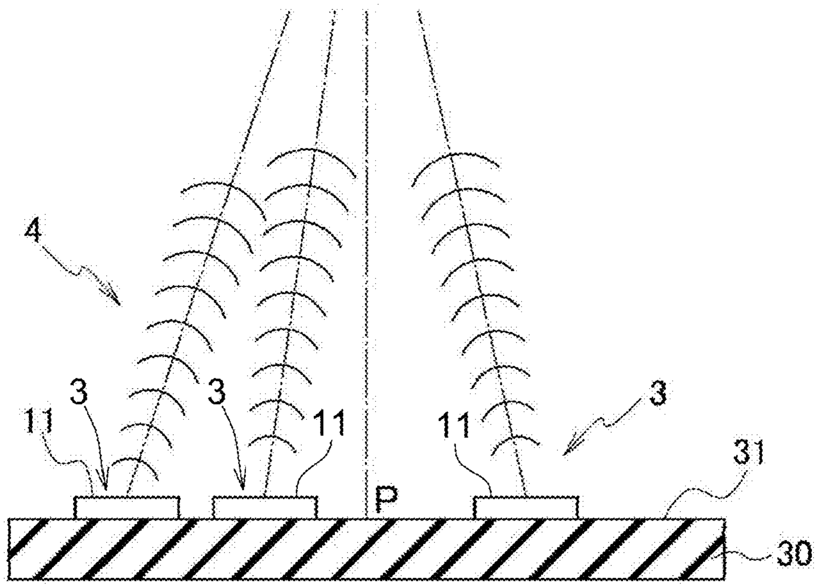
FIG. 11 is a section diagram of sound waves produced from a transducer and converged.

FIG. 10 shows a top view of a transducer array 4 according to the embodiment. FIG. 11 shows a section diagram of the transducer array 4 according to the embodiment. The section diagram of FIG. 11 shows a cross section along the section line XI-XI in top view of FIG. 10. In the transducer array 4 of the embodiment, on a flat main surface 31 of a supporting substrate 30, a plurality of transducers 3 have main surfaces 11 thereof in a two-dimensional arrangement parallel to the main surface 31 of the supporting substrate 30 and facing one side away from the main surface 31 of the supporting substrate 30.

As shown in FIG. 9, in the transducer 3, the cantilevers of the plurality of vibrating membranes 12 are equidistantly arranged into six rows in the longitudinal direction and four columns in the lateral direction on the main surface 11 of the substrate 10 in a substantially rectangular shape in top view; however, in FIG. 10, the cantilevers of the plurality vibrating membranes 12 are represented by cantilevers in two rows and two columns. The supporting substrate 30 is in a substantially plate-like shape having a predetermined thickness, and has a substantially rectangular shape with substantially equal longitudinal and lateral dimensions in top view. In addition, the supporting substrate 30, similar to the substrate 10, may be formed of a glass substrate, an organic material or other types of raw materials, or may be a printed substrate.

The plurality of transducers 3 disposed on the main surface 31 of the supporting substrate 30 include six transducers 3, which are adjacent to a reference P substantially at a center of the main surface 31 and are arranged on a periphery distanced from the reference point P by a predetermined interval and around the reference point P, that is, on sixth rotationally symmetrical positions around the reference point P. In addition, the position of the transducer 3 may be a reference point on the main surface 11 such as the center of gravity of the main surface 11 of the transducer 3. In top view, the lateral side of the substrate 10 in a substantially rectangular shape of the transducer 3 extends in a direction from the reference point P substantially at the center of the main surface 31 of the supporting substrate 30 toward each transducer 3, and the cantilevers of the plurality of vibrating membranes 12 disposed on the main surface 11 also extend in the above direction. A pair of transducers 3 opposite to each other with the reference point P in between extend along a longitudinal direction of the supporting substrate 30 in a substantially rectangular shape in top view. These sixth transducers 3 are referred to as first peripheral transducers $3_1$.

The plurality of transducers 3 disposed on the main surface 31 of the supporting substrate 30 include twelve transducers 3, which are arranged on a periphery around the first peripheral transducers 3 and distanced from the reference point P by a predetermined interval, that is, on twelve rotationally symmetrical positions around the reference point P. Similar to the first peripheral transducers 3, in top view, the lateral side of the substrate 10 in a substantially rectangular shape of the transducer 3 extends in a direction from the reference point P substantially at the center of the main surface 31 of the supporting substrate 30 toward each transducer 3, and the transducers of the plurality of vibrating membranes 12 disposed on the main surface 11 also extend in the above direction. In top view, among the twelve transducers 12, the lateral sides of the substrates 10 in a substantially rectangular shape of six transducer 3 alternately arranged on the periphery extend in a direction as that of the six transducers 3 of the first peripheral transducers $3_1$, and the transducers of the plurality of vibrating membranes 12 disposed on the main surface 11 also extend in the same direction. These twelve transducers 3 are referred to as second peripheral transducers $3_2$.

Among the plurality of transducers 3 disposed on the main surface 31 of the supporting substrate 30, the cantilevers in an initial stationary state of the plurality of vibrating membranes 12 are configured to bend upward from the main surface 31 according to each transducer 3, and a degree of bending of the cantilevers increases as the positions of the transducers 3 distance away from the reference point P of the main surface 31 of the supporting substrate 30. For example, in the first peripheral transducers $3_1$ to the second peripheral transducers $3_2$, the degree of bending of the cantilevers in the initial state of the vibrating membranes 12 gradually increases in an order of from the first peripheral transducers $3_1$ to the second peripheral transducers $3_2$.

Thus, the degree of bending upward of the cantilevers in the stationary state of the vibrating membranes 12 of the transducers 3 from the main surface 11 increases as the transducers 3 distance away from the reference point P of the main surface 31 of the supporting substrate 30. Sound waves produced from the transducers 3 travel toward a normal direction of the cantilevers in the stationary state of the vibrating membrane 12 of the transducers 3, and then travel in an inclined direction from a normal direction of the main surface 31 of the supporting substrate 30 toward the reference point P as the transducers 3 distance away from the reference point P. Thus, the sound waves produced from the plurality of transducers 3 disposed on the main surface 31 travel to so as to converge toward the normal line of the reference point P on the main surface 31. The level of convergence can be adjusted by means of controlling the degree of bending of the cantilevers of the vibrating membranes 12.

In addition, in the transducer array 4 of the embodiment, the extension direction of the cantilevers of the vibrating membranes 12 of the plurality of transducers 4 is set to be a direction from the reference point O of the main surface 31 of the supporting substrate 30 toward the transducers 3; however, the present invention is not limited to the above example, and such extension direction may also be set to be a direction from the transducers 3 toward the reference point P. In this case, in order to have the sound waves produced by the plurality of transducers 3 of the transducer array 4 travel so as to converge toward the normal line of the reference point P of the main surface 11, the degree of bending downward, in the initial state from the main surface 11, of the cantilevers of the vibrating membranes 12 of the plurality of transducers 3 disposed on the main surface 31 of the supporting substrate 30, increases as the transducers 3 distance away from the reference points P.

In the transducer array 4 of the embodiment, since the transducers 3 produce a sufficient volume when used as a speaker, the transducer array 4 of the embodiment including the plurality of transducers 3 can also produce a sufficient volume. In addition, in the transducer array 4 of the embodiment, the sound waves produced by the transducers 3 can also be gathered and have directivity.

The invention claimed is:

1. A transducer, comprising:

a substrate;

a plurality of vibrating membranes, in a configuration of cantilevers, disposed on a main surface of the substrate, wherein one side of each of the vibrating membranes is connected to the main surface, and remaining sides are free of connection to any physical object; and a plurality of piezoelectric elements, having a rectangular shape in a plan view and stacked on the plurality of vibrating membranes for generating a voltage to excite each vibrating membrane, wherein the cantilevers of the plurality of vibrating membranes extend in a direction from a reference point on the main surface toward the cantilevers, or in a direction from the cantilevers toward the reference point, and longitudinal dimensions of the plurality of piezoelectric elements extend along the extending direction of the respective cantilevers.

2. The transducer of claim 1, wherein the cantilevers of the plurality of vibrating membranes extend in a direction from the reference point toward the cantilevers and bend upward from the main surface in an initial stationary state, a degree of bending increases as the vibrating membranes distance away from the reference point.

3. The transducer of claim 1, wherein the cantilevers of the plurality of vibrating membranes extend in a direction from the cantilevers toward the reference point and bend downward from the main surface in an initial stationary state, a degree of bending increases as the vibrating membranes distance away from the reference point.

4. The transducer of claim 1, wherein in a pair of electrode layers of the plurality of piezoelectric elements, wirings are respectively connected from electrode pads to supply a voltage for driving the vibrating membranes.

5. The transducer of claim 2, wherein in a pair of electrode layers of the plurality of piezoelectric elements, wirings are respectively connected from electrode pads to supply a voltage for driving the vibrating membranes.

6. The transducer of claim 3, wherein in a pair of electrode layers of the plurality of piezoelectric elements, wirings are respectively connected from electrode pads to supply a voltage for driving the vibrating membranes.

7. The transducer of claim 4, wherein the wirings include a wire common to the pair of electrode layers of the plurality of piezoelectric elements.

8. The transducer of claim 7, wherein the plurality of vibrating membranes include at least one group including a plurality of vibrating membranes arranged in at least a part of rotationally symmetrical positions around the reference point within the main surface.

9. The transducer of claim 8, wherein the wirings include a wire common to each group of the plurality of vibrating membranes.

10. The transducer of claim 1, wherein a natural vibration frequency of the plurality of vibrating membranes is a frequency greater than an audible range.

11. The transducer of claim 2, wherein a natural vibration frequency of the plurality of vibrating membranes is a frequency greater than an audible range.

12. The transducer of claim 1, wherein the plurality of vibrating membranes include vibrating membranes having same shape in a plane of the main surface.

13. The transducer of claim 1, wherein the substrate includes a silicon substrate.

14. An electronic device, comprising:

a speaker, including the transducer of claim 1.

15. A transducer array, comprising a plurality of transducers, each of the transducers includes:

a substrate;

a plurality of vibrating membranes in a configuration of cantilevers, disposed on a main surface of the substrate and extending in one direction within the main surface, wherein one side of each of the vibrating membranes is connected to the main surface, and remaining sides are free of connection to any physical object; and a plurality of piezoelectric elements, having a rectangular shape in a plan view and stacked on the plurality of vibrating membranes to excite each vibrating membrane, wherein the plurality of transducers are in a two-dimensional arrangement with their main surfaces facing a same side, the cantilevers of the plurality of transducers extend in a direction from a reference point in a plane including the two-dimensional arrangement toward the transducers, or in a direction from the transducers toward the reference point, and longitudinal dimensions of the plurality of piezoelectric elements extend along the extending direction of the respective cantilevers.

16. The transducer array of claim 15, wherein the cantilevers of the plurality of vibrating membranes of the plurality of transducers extend in a direction from the reference point toward the transducers and bend upward from the main surface in an initial stationary state, a degree of bending increases as the transducers distance away from the reference point.

17. The transducer array of claim 15, wherein the cantilevers of the plurality of vibrating membranes of the plurality of transducers extend in a direction from the transducers toward the reference point and bend downward from the main surface in an initial stationary state, a degree of bending increases as the transducers distance away from the reference point.

18. The transducer array of claim 15, wherein the transducer array includes at least one group including a plurality of transducers arranged in at least a part of rotationally symmetrical positions around the reference point in a plane including the two-dimensional arrangement.

19. The transducer array of claim 16, wherein the transducer array includes at least one group including a plurality of transducers arranged in at least a part of rotationally symmetrical positions around the reference point in a plane including the two-dimensional arrangement.

20. The transducer array of claim 17, wherein the transducer array includes at least one group including a plurality of transducers arranged in at least a part of rotationally symmetrical positions around the reference point in a plane including the two-dimensional arrangement.

* * * * *